Jan. 17, 1928.

P. MASSON 1,656,214

DIAPHRAGM VALVE FOR AUTOMOBILES

Filed Oct. 25, 1926

Inventor.
Pierre Masson
By
Attorney.

Patented Jan. 17, 1928.

1,656,214

UNITED STATES PATENT OFFICE.

PIERRE MASSON, OF VILLEURBANNE, FRANCE.

DIAPHRAGM VALVE FOR AUTOMOBILES.

Application filed October 25, 1926, Serial No. 144,077, and in France November 17, 1925.

This invention relates to a valve for the gasoline piping systems of automobiles and the like. This valve, which comprises a diaphragm which is pressed onto a seat by a spring-actuated member, does not involve the employment of a packing-gland, stuffing-box or the like and hence does not leak in use. It is easily controlled by the driver from his seat through rods or flexible cords.

Figure 1:
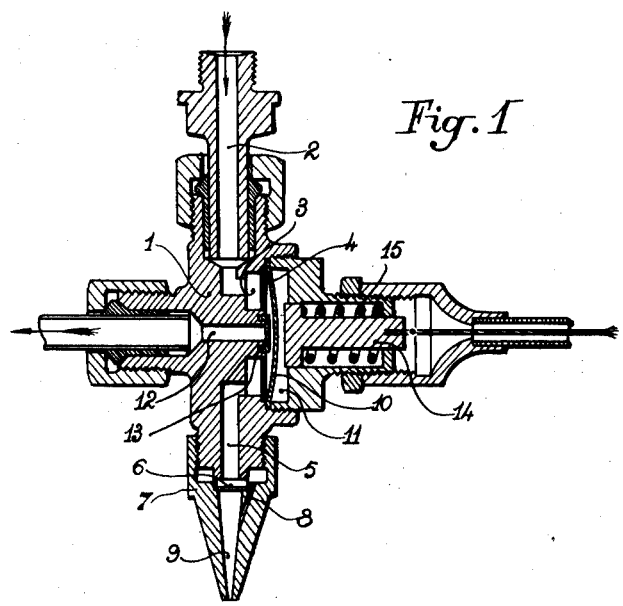
Fig. 1 is a cross-section of a diaphragm valve in which the pressing member is directly controlled by a cord.

Referring to Fig. 1, the valve comprises a body 1 into which the gasoline is admitted by a pipe 2 and from which it is led into an annular chamber 3 which contains a gauze filter 4.

A passage 5 leads from chamber 3 and is closed by a piece of packing 6 which is pressed by a cap-nut 7 provided with an axial hole 9 which is preferably tapered as shown in Fig. 1. When nut 7 is loosened, gasoline flows through an inclined hole 8 into the axial hole 9, thus insuring an easy draining-off.

A diaphragm 10 is placed close to the filter 4, in a circular chamber 11. An axial passage 12 is provided in the body 1 for the outlet of gasoline from chamber 11. A packing ring 13 is placed around the inlet of passage 12 and diaphragm 10 may be pressed against said ring by a piston-like member 14 which is acted upon by an expansible spring 15.

Chamber 11 is hermetically divided into two parts by diaphragm 10 and there is no need of packing gland, stuffing box or the like around piston 14, which is directly controlled by a cord, for instance.

Figure 2:
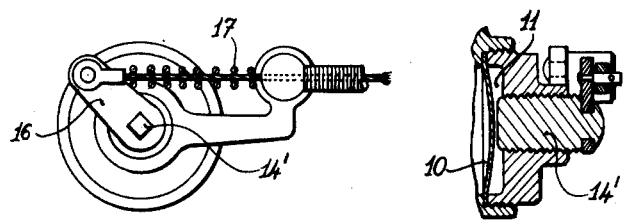
Figs. 2 and 3 show a valve in which the pressing member is threaded and is rotated by the controlling cord, Fig. 2 being a face view and Fig. 3 a transverse section.
Figure 3:
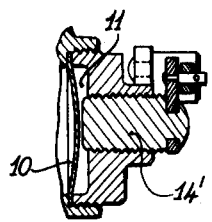

In Figs. 2 and 3, the action of the piston member here designated 14' is different. Member 14' is threaded and its movements toward or from diaphragm 10 are obtained by rotation, a lever 16 being keyed to the outer end of said member and being acted upon by a spring 17 and by a cord or rod.

The pitch of the threads is such that a convenient longitudinal displacement of member 14' is obtained by a limited angular movement of lever 16.

What I claim as my invention is:

1. A diaphragm valve for the gasoline piping systems of automobiles and the like comprising in combination a body providing a chamber into which gasoline is admitted and an outlet passage for the gasoline leading from said chamber; a diaphragm forming a gasoline-tight partition in said chamber; a threaded member exterior to the part of said chamber into which gasoline is admitted; a spring-actuated lever on said member, said spring-actuated lever rotating said member in such a direction that it presses said diaphragm against the inlet of said passage to hermetically close the same; and means for rotating said lever in a direction opposite to the action of the spring.

2. A diaphragm-valve for the gasoline piping systems of automobiles and the like, comprising in combination a body providing an annular chamber into which gasoline is admitted and an outlet passage for the gasoline leading from said chamber; an annular filter forming a wall of said chamber; a circular chamber close to said annular chamber and separated therefrom by said filter, said chambers being substantially co-axial with each other and with said outlet passage; a diaphragm forming a gasoline-tight partition in said circular chamber; a member exterior to the part of said chamber into which gasoline is admitted; and means for causing said member to press said diaphragm against the inlet of said passage and thereby hermetically close the same.

3. A diaphragm-valve as claimed in claim 2, in which a drain-off hole is provided in connection with the annular chamber, a packing at the outlet of said hole; and a nut for pressing said packing against said outlet, said nut having both an axial hole and an oblique hole whereby; by loosening said nut, gasoline will be permitted to flow through said oblique and axial holes for draining-off purposes.

In testimony whereof I affix my signature.

PIERRE MASSON.